United States Patent [19]

Ishii et al.

[11] Patent Number: 5,675,789
[45] Date of Patent: Oct. 7, 1997

[54] FILE COMPRESSION PROCESSOR MONITORING CURRENT AVAILABLE CAPACITY AND THRESHOLD VALUE

[75] Inventors: Masanori Ishii; Masashi Omuro, both of Tokyo, Japan

[73] Assignee: NEC Corporation, Tokyo, Japan

[21] Appl. No.: 669,847

[22] Filed: Jun. 26, 1996

Related U.S. Application Data

[63] Continuation of Ser. No. 139,030, Oct. 21, 1993, abandoned.

[30]     Foreign Application Priority Data

Oct. 22, 1992   [JP]   Japan ................... 4-308173

[51] Int. Cl.$^6$ ........................................... G06F 17/30
[52] U.S. Cl. ........................ 395/620; 364/715.02
[58] Field of Search ........................ 395/620, 444, 395/445, 463, 460, 612, 616; 364/715.02

[56]            References Cited

U.S. PATENT DOCUMENTS

| | | | |
|---|---|---|---|
| 4,888,681 | 12/1989 | Barms et al. | 395/600 |
| 5,109,433 | 4/1992 | Notemboom | 382/40 |
| 5,128,776 | 7/1992 | Scorse et al. | 358/426 |
| 5,276,898 | 1/1994 | Keil et al. | 395/800 |
| 5,313,631 | 5/1994 | Kao | 395/600 |
| 5,317,728 | 5/1994 | Truis et al. | 395/600 |
| 5,367,698 | 11/1994 | Webber et al. | 395/800 |
| 5,374,916 | 12/1994 | Chu | 340/146.2 |
| 5,403,639 | 4/1995 | Belsan et al. | 395/620 |
| 5,579,507 | 11/1996 | Hosoouchi et al. | 395/497.02 |

OTHER PUBLICATIONS

Israel et al, "Evolutionary Path to Network Storage Management", *USENIX*, 1991 (Winter) p. 185–198.

Alsberg, "Space and Time Savings Through Large Path Base Compression and Dynamic Restructuring". Aug. 1975 pp. 1114–1122, Proceedings of the IEEE, vol. 63 No. 8.

Lelewer, D. A. et al., "Data Compression", *ACM Computing Surveys*, vol. 19, No. 3, pp. 261–296, (Sep. 1987).

*Primary Examiner*—Thomas G. Black
*Assistant Examiner*—Jack M. Choules
*Attorney, Agent, or Firm*—Foley & Lardner

[57]             ABSTRACT

A file compression processor of the present invention comprises a file status monitor which compares the current available capacity on the file unit to record files and the threshold value predetermined as the upper limit of the available capacity and a file compression portion which compresses a file on said file unit when the file status monitor judges that the current available capacity is smaller than the threshold. It further comprises a file attribute controller which stores the control information for the files recorded on the file unit including the last access date, the number of accesses, whether the file is already compressed or not and a search portion which searches for files not yet compressed with low access frequency based on the control information so as to select files to be compressed for compression by said compression portion and a compression method selector which determines the data type and the access frequency of the file for compression by said compression portion based on the control information, selects the file compression method suitable for said data type and the access frequency and instructs said compression portion to execute processing by the selected compression method.

15 Claims, 9 Drawing Sheets

FILE COMPRESSION PROCESSOR MONITORING CURRENT AVAILABLE CAPACITY AND THRESHOLD VALUE

This application is a continuation of application Ser. No. 08/139,030, filed Oct. 21, 1993, now abandoned.

BACKGROUND OF THE INVENTION

1. Field of the Invention

The present invention relates to a file compression processor more particularly, it relates to a file compression processor which records image data and/or text data to file recording media such as magneto-optic disks (MO) and hard disks after data compression processing.

2. Description of the Related Art

Recently, on-line information services have become widespread. In such services, a database is created by recording text data and binary data (programs and image data) on a large capacity storage media such as magneto-optic disks and hard disks, so that a user can access such a database from a terminal through communication lines when necessary and can retrieve the desired data.

Such databases usually have an extremely large volume of data and utilize various data compression techniques for recording data to the storage media, which increase the virtual capacity of the record files.

Examples of such data file compression technology in such a system are disclosed by Data Compression, ACM Computing Surveys, Vol. 19, No. 3 pp. 261–296, September 1987.

In a conventional data file compression system using such a data compression method, all files are compressed for storage to a file unit such as disks. This means that the files are compressed even when the file unit has sufficient available capacity. Decompression processing is indispensable to use such files, which results in reduced efficiency of decompression processing.

Further, the data compression method is limited to only one. A different compression method cannot be used even when the applicable file does not require the same compression/decompression speed and compression ratio, depending on the access frequency and the file type determined by the last access data and the number of accesses of the file to be compressed.

SUMMARY OF THE INVENTION

The present invention is made to solve the above drawbacks of the prior art. It is a first object of the present invention is to provide a file compression processor which enables effective file utilization and prevents file compression when there is sufficient available capacity in the file unit and selects the suitable compression method corresponding to the access frequency and the type of the file.

It is a second object of the present invention to provide a file compression processor for effective file utilization by enabling increase/decrease of the threshold serving as the reference of the available file capacity (the capacity to be always ensured).

It is a third object of the present invention to provide a file compression processor which enables file utilization with minimum decompression by decompressing these compressed files with high access frequency when the available file capacity increased. According to one aspect of the present invention to attain the above objects, a file compression processor comprises file status monitor means which compares the current available capacity on a file unit to record files and the threshold value predetermined as the upper limit of the available capacity value and file compression means which compresses a file on the file unit when the file status monitor means judges that the current available capacity is smaller than the threshold.

According to the still preferred construction, a file compression processor further comprises a file attribute controller which stores the control information for the files recorded on the file unit including the last access date, the number of accesses and whether the file is already compressed or not and file search means which searches for files not yet compressed with low access frequency based on the control information of the file attribute controller so as to select files to be compressed for compression by the compression means.

According to the still preferred construction, a file compression processor further comprises a file attribute controller which stores the control information for the files recorded on the file unit. The control information includes the last access date, the number of accesses, whether the file is already compressed or not and the data type. Also provided is a compression method selection means which determines the data type and the access frequency of the file compressed by the compression means based on the control information of the file attribute controller, selects the file compression method suitable for the data type and the access frequency and instructs the compression means to execute processing by the selected compression method.

According to another preferred construction, a file compression processor further comprises a file attribute controller which stores the control information for the files recorded on the file. The control information includes the last access date, the number of accesses, whether the file is already compressed or not and the data type. Also included is a file search means which searches for files not yet compressed with a low access frequency based on the control information of the file attribute controller, so as to select files to be compressed for compression by the compression means. Further, there is a compression method selection means which determines the data type and the access frequency of the file to be compressed selected by the file search means based on the control information of the file attribute controller, selects the file compression method suitable for the data type and the access frequency and instructs the compression means to execute processing by the selected compression method.

According to another preferred construction, a file compression controller further comprises file decompression means which decompresses files already compressed corresponding to the access request from the compression file recorded on the file unit.

According to another aspect of the present invention to attain the above objects, a file compression processor comprises a file status monitor means which compares the current available capacity on a file unit to record files and the threshold value predetermined as the upper limit of the available capacity value. There is a file compression means which compresses a file on the file unit when the file status monitor means judges that the current available capacity is smaller than the threshold. Also, there is a threshold change means which reduces the threshold by the predetermined adjustment value when the current available capacity is smaller than the threshold and there is no file to be compressed, and which increases the threshold value when the current available capacity is larger than the threshold value.

According to another preferred construction, a file compression processor further comprises a file attribute controller which stores the control information for the files recorded on the file including. The control information includes the last access date, the number of accesses, whether the file is already compressed or not and the data type. Also, a file search means searches for files not yet compressed with low access frequency, based on the control information of the file attribute controller, so as to select files to be compressed for compression by the compression means.

According to another preferred construction, a file compression processor further comprises a file attribute controller which stores the control information for the files recorded on the file unit including the last access date, the number of accesses, whether the file is already compressed or not and the data type. There is a compression method selection means which determines the data type and the access frequency of the file compressed by the compression means, based on the control information of the file attribute controller, which selects the file compression method suitable for the data type and the access frequency and which instructs the compression means to execute processing by the selected compression method.

According to another preferred construction, a file compression processor further comprises a file attribute controller which stores the control information for the files recorded on the file unit. The control information includes the last access date, the number of accesses, whether the file is already compressed or not and the data type. There is a file search means which searches for files not yet compressed, with low access frequency based on the control information of the file attribute controller, so as to select files to be compressed for compression by the compression means. There is also a compression method selection means which determines the data type and the access frequency of the file to be compressed selected by the file search means, based on the control information of the file attribute controller, which selects the file compression method suitable for the data type and the access frequency and which instructs the compression means to execute processing by the selected compression method.

According to another preferred construction, a file compression processor further comprises a file attribute controller which stores the control information for the files recorded on the file unit. The control information includes the last access date, the number of accesses, whether the file is already compressed or not, the maximum and the minimum differences between the file sizes before and after compression. There is a file search means which searches for files not yet compressed, with low access frequency based on the control information of the file attribute controller, so as to select files to be compressed for compression by the compression means, the threshold change means reducing the threshold by the predetermined adjustment value if there is no file to be compressed and the threshold value becomes larger than the maximum difference between the file sizes before and after compression when the threshold value is reduced by the predetermined adjustment value.

According to the still preferred construction, a file compression processor further comprises a file decompression means which decompresses files already compressed corresponding to the access request from the compression file recorded on the file unit.

According to another preferred construction, a file compression processor further comprises a file decompression means which decompressed decompresses compressed files until the available capacity becomes close to the initial value, when the file status monitor means judges that the threshold is the initial value and the available capacity is larger than the threshold.

According to another preferred construction, a file compression processor further comprises a file attribute controller which stores the control information for the files recorded on the file unit. The control information includes the last access date, the number of accesses, whether the file is already compressed or not, the maximum and the minimum differences between the file sizes before and after compression. There is a file search means which searches for already compressed files with high access frequency, based on the control information of the file attribute controller, so as to select compressed files for decompression by the decompression means.

According to another preferred construction of a file compression processor, the compressed files are selected for decompression by the decompression means when it is judged that the threshold is the initial value and the difference between the available capacity and the threshold is larger than the minimum difference between the file sizes before and after compression.

According to another preferred construction of a file compression processor, the threshold change means returns the threshold to the initial value when it judges that the threshold is not the initial value and the available capacity is larger than the initial thershold value.

According to another preferred construction of a file compression processor, the threshold change means increases the threshold by the product of the predetermined adjustment value and the integer obtained by dividing the difference between the available capacity and the threshold with the predetermined adjustment value, when it is judged that the threshold is not the initial value and the available capacity is smaller than the initial threshold value, and the difference between the available capacity and the threshold is larger than the predetermined adjustment value.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative as to the invention, but are for explanation and understanding only.

In the drawings.

DETAILED DESCRIPTION OF PREFERRED EMBODIMENT

Figure 1:
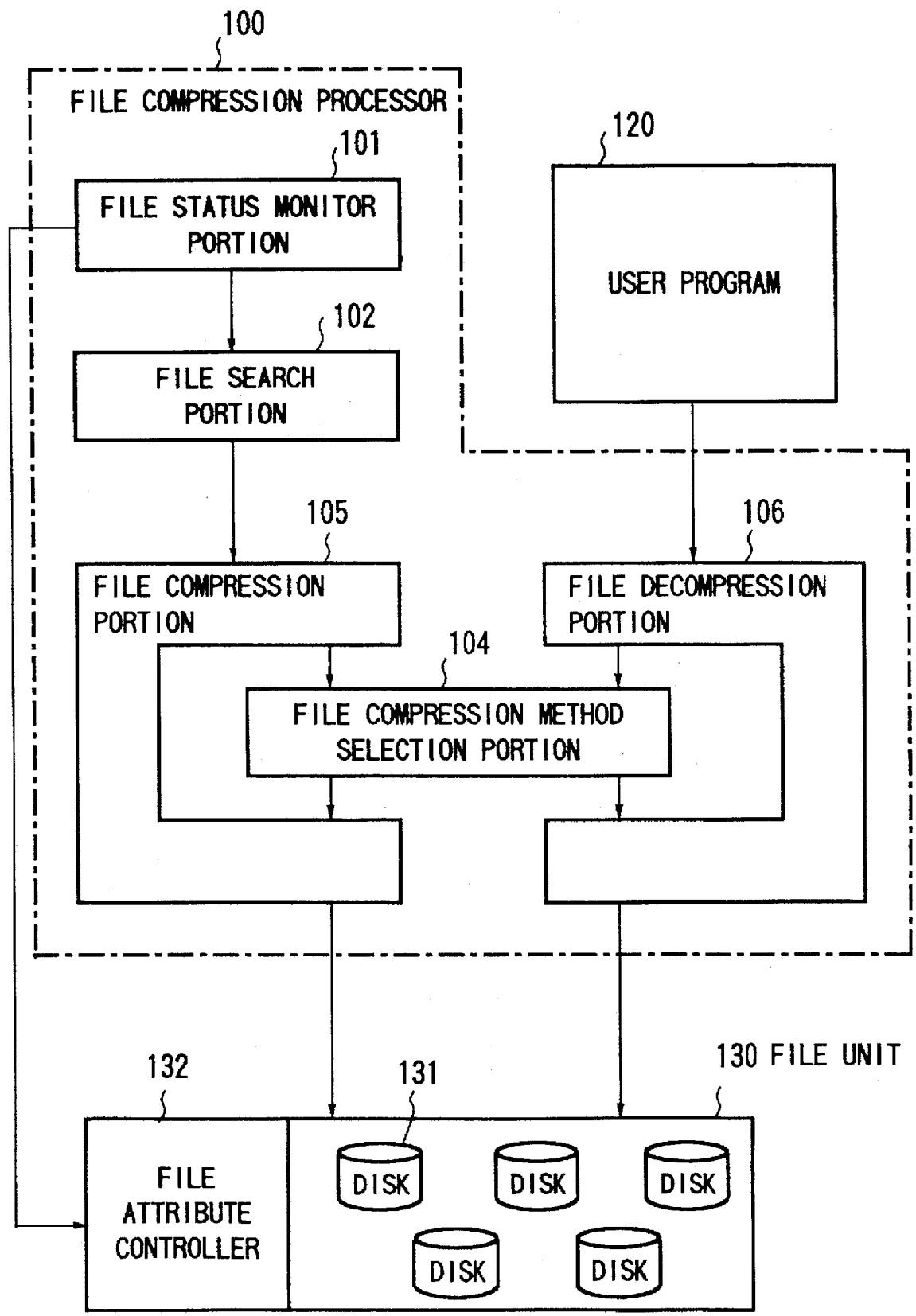
FIG. 1 is a block diagram of a file compression processor according to a first embodiment of the present invention.

Referring to the attached figures, preferred embodiments of the present invention will be described below. FIG. 1 is a block diagram of a file processing system using a file compression processor according to a first embodiment of the present invention. In the figure, a file processing system comprises a file compression processor 100, a user program 120 and a file unit 130.

The file compression processor 100 serves for automatic file compression and decompression processing asynchronously with the user program 120 for a disk 131 in the file unit 130. To use a file, the user program 120 accesses a file recorded on the file unit 130 via the file compression processor 100. The file unit 130 comprises disks 131 which are recording media such as magneto-optic disks (MO) or hard disks, and a file attribute controller 132 to control information on the files recorded on the disks 131.

The file compression processor 100 comprises, as shown in the figure, a file status monitor portion 101, a file search portion 102, a file compression method selection portion 104, a file compression portion 105 and a file decompression portion 106.

The file status monitor portion 101 judges whether the current available file capacity on the file unit 130 controlled by the file attribute controller 132 is over or below the predetermined threshold value (the available file capacity to be ensured in the file unit 130).

When the file status monitor portion 101 judges that the current available file capacity is below the threshold, the file search portion 102 searches the files to be compressed (all files except those for which compression is prohibited by the user) for a file not yet compressed with a lower access frequency. The search of files to be compressed is made by referring to the file control information at the file attribute controller 132.

The file attribute controller 132 has as file control information, including a list of file names and directories, as well as the last access date and the number of accesses for each file. The access frequency of a file is determined based on the last access date and the number of accesses for that file and is given as high, medium and low. The standard of access frequency classification is set in the file search portion 102. Alternatively, a user may set the standard or classes.

The file compression portion 105 actually compresses data of the searched file to be compressed, so as to record it on the disk 131 in the file unit 130. According to the attributes of the file to be compressed including access frequency and file type, it selects an appropriate data compression method for compression of the file.

The file compression method selection portion 104 selects the method used by the data compression portion 105 to compress data of the file to be compressed. It selects the data compression method suitable for the file considering the data attribute (whether it is text data or binary data such as programs and image data) and access frequency, included among the control information concerning the file in the file attribute controller 132.

The data attribute of a file is checked in the selection of the data compression method so as to select a suitable data compression method with a higher compression ratio. The access frequency of a file is used for selecting a data compression method with shorter data compression/decompression time. The data compression methods selection portion 104 selects, from some data compression methods selected according to the data attribute, the one with shorter data compression/decompression time for a file with higher access frequency and the one with a higher compression ratio for a file with lower access frequency.

The file attribute controller 132 of the file unit 130 controls, as described above, the available file capacity of the file unit 130, file names and directory names, the maximum and minimum differences between the file sizes before and after the file compression, and names of the files with such maximum and minimum values, as well as information for each file including file size, data attribute (text data file, program file or image data file), identifier of compression prohibition, whether the file is already compressed or not yet compressed (compression/non-compression information), compression method, the last access date, the number of accesses, and file size after compression (for already compressed files). The indicator of compression prohibition is given to the file for which the user specified compression prohibition.

Though the file attribute controller 132 is physically separated from the disks 131 in FIG. 1, the files actually have a file control information area to record the above file control information separately from the data area, and the file control information in such file control information area is controlled by the file attribute controller 132.

The file decompression portion 106 serves for decompression of a file in response to a file utilization request from the user program 120. It refers to the data compression method as one of the file control information so as to perform decompression processing. However, if the file is found to be a "non-compression" file as a result of checking the compression/non-compression information at the file attribute controller 132, decompression is not made at all and the file is just read out from the file unit 130.

Figure 2:
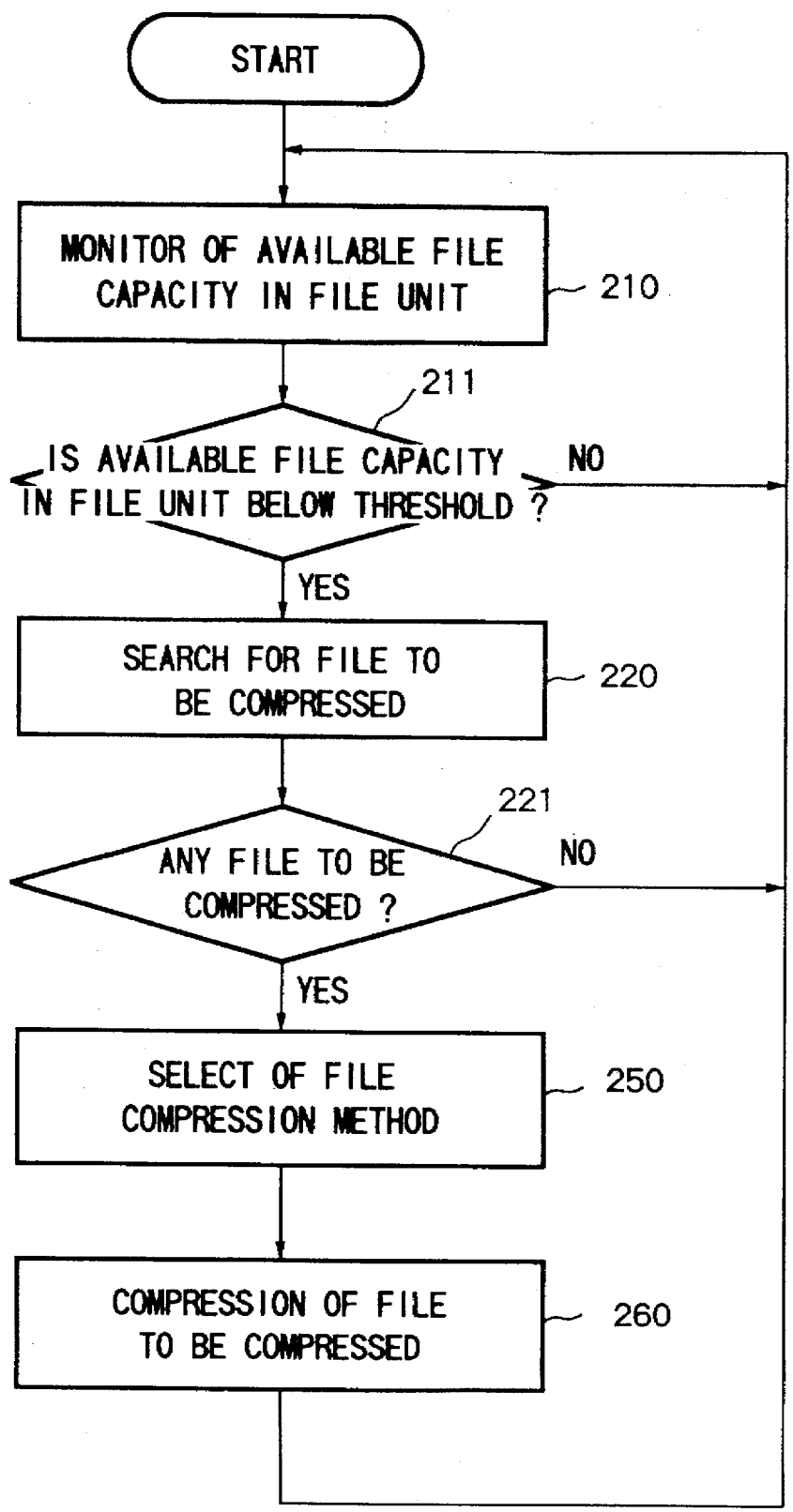
FIG. 2 is a flowchart to show the operation of file compression processing of the file compression processor according to the first embodiment.

FIG. 2 is a flowchart to illustrate the operation of the system shown in FIG. 1. The file status monitor portion 101 monitors the current available file capacity in the file unit 130 asynchronously with the user program 120 (Step 210). Available capacity and available file area information for the file unit 130 are stored in the file attribute controller 132 on the file unit 130 as file control information and such information is controlled by the file control function of the operating system. Upon any change in available file area or available capacity information, the file control information in the file attribute controller 132 is updated, and creation, deletion, extension and reduction of a file causes the information to be changed under the control of the operation system.

The file status monitor portion 101 compares the current available file capacity and the threshold at the file unit 130 (Step 211). If the available file capacity is larger than the threshold, the data compression is not made because the file unit 130 has sufficient available file capacity. Since the data is not compressed in this case, the file can be used without decompression processing immediately after a file utilization request. This results in speedy file accessing.

It is not until the available capacity becomes lower than the threshold value that files are compressed. For such compression, a search for files to be compressed is conducted based on the file control information of the file attribute controller 132 (Step 220). From the files other than those for which compression is prohibited by the user, non-compression files with low access frequency are picked up. If there is no file to be compressed, the system returns to Step 210. In Step 221, it is judged whether there is any file to be compressed. The term "File to be compressed" means the files subject to compression until the available file capacity exceeds the predetermined threshold value.

When files to be compressed are picked up, they are subject to data compression processing (Step 250). The file compression method selection portion 104 here selects the method with suitable compression ratio and compression/decompression speed depending on the file access frequency and data attribute.

In selecting a data compression method, the file compression method selection portion 104 selects the one suitable for the applicable data attribute by checking the data attribute held by the file attribute controller 132. Next, the access frequency is determined from the last access date and the number of accesses at the file attribute controller 132. The file compression method with a shorter decompression time is selected for files with higher access frequency and the file compression method with a higher compression ratio is selected for files with lower access frequency. The data compression methods used here are known methods. For example, the following data compression methods may be utilized in this embodiment.

Data compression methods for text files include Huffman coding, arithmetic coding and Lempel-Ziv coding. In Huffman coding, the number of bits to represent a character is changed depending on the frequency of the character. Huffman coding involves a code table in tree structure, which may be fixed or variable. The former is called the static Huffman coding and the latter the dynamic Huffman coding.

Arithmetic coding is the method where Huffman coding is applied to periods considering the probability of appearance for the character in the period. Lempel-Ziv coding is the method taking advantage of repetition of character strings, where compression is made by deleting redundant strings. In general, Lempel-Ziv coding has a lower compression ratio than Huffman and arithmetic coding but has a higher compression/decompression speed. The file compression method selection portion 104 selects Lempel-Ziv coding for files with high access frequency and Huffman or arithmetic coding for files with low access frequency.

Data compression methods for binary files (image data) include the run-length coding and the differential mapping method. The former represents the consecutive identical data by the number. By representing the pixels in an image with numbers, it can largely save the number of bits for the number of strings of image elements, but it has a lower processing speed. The difference mapping method represents the image not by the brightness values themselves but by the difference from the adjacent pixel brightness given in an array. The file compression method selection portion 104 selects, in the case of image data, the differential mapping method for files with high access frequency and the run-length coding for files with low access frequency.

Files are compressed by the data compression method thus selected (Step 260). Upon completion of file compression processing, the system returns to Step 210 to repeat the procedure. The file compression processing is repeated until the available file capacity becomes higher than the threshold value. When it is judged that the available file capacity is over the threshold in Step 211, the following compression processing is deemed to be unnecessary and is not performed. Thereafter, compression processing is resumed when the available file capacity becomes lower than the threshold due to addition of a new file or for any other reason.

Figure 3:
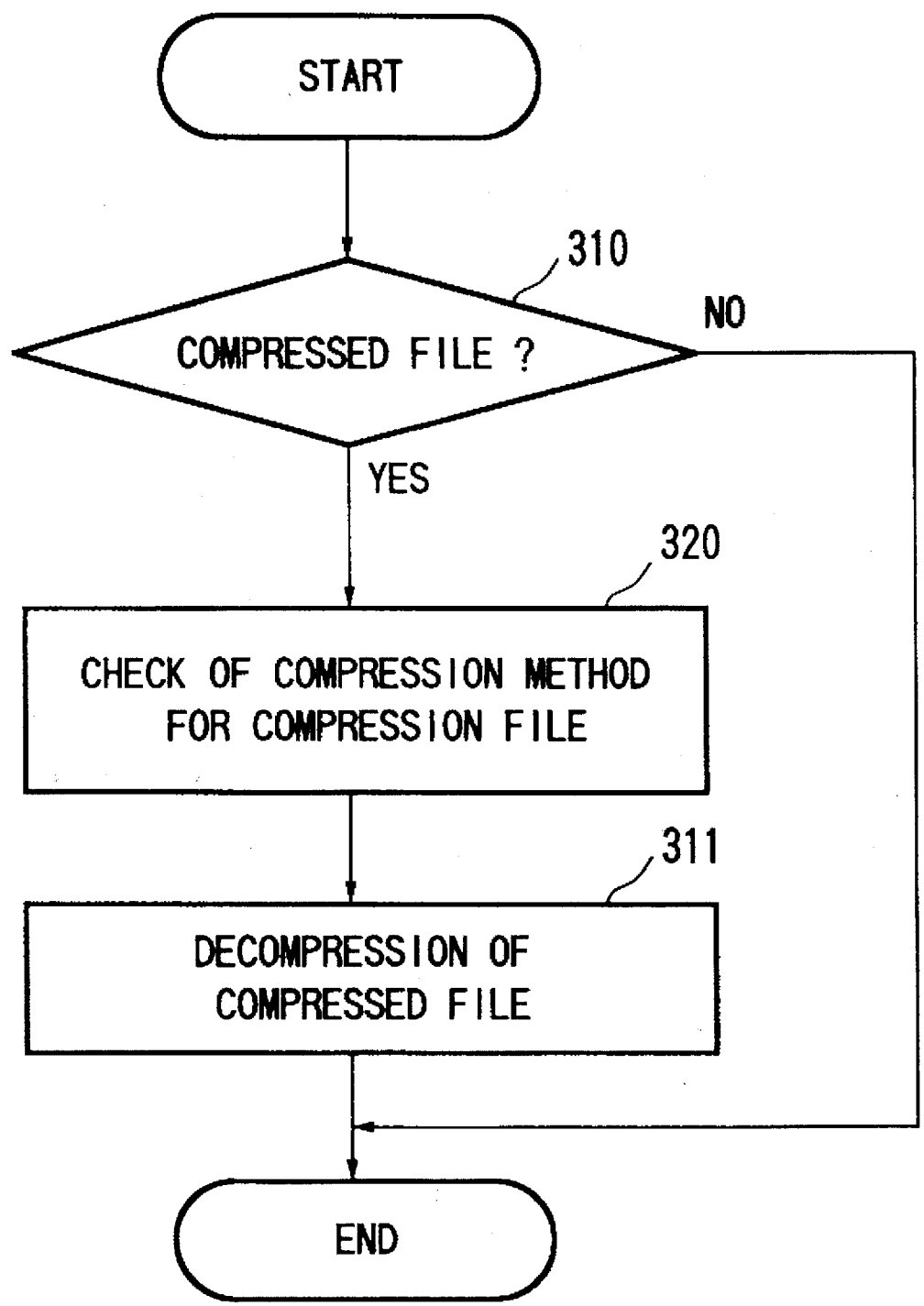
FIG. 3 is a flowchart to show the access operation by user program according to the first embodiment.

FIG. 3 is a flowchart to illustrate the processing when the user program 120 uses a file on the file unit 130.

Firstly, the file decompression portion 106 judges whether the file is already compressed or not by checking the file compression/non-compression information in the file attribute controller 132 (Step 310). If the file is not compressed, then the file is read out as it is. If it is compressed, then the data compression method is obtained from the file attribute information (Step 320) and the file is decompressed by the method corresponding to that compression method (Step 311).

Figure 4:
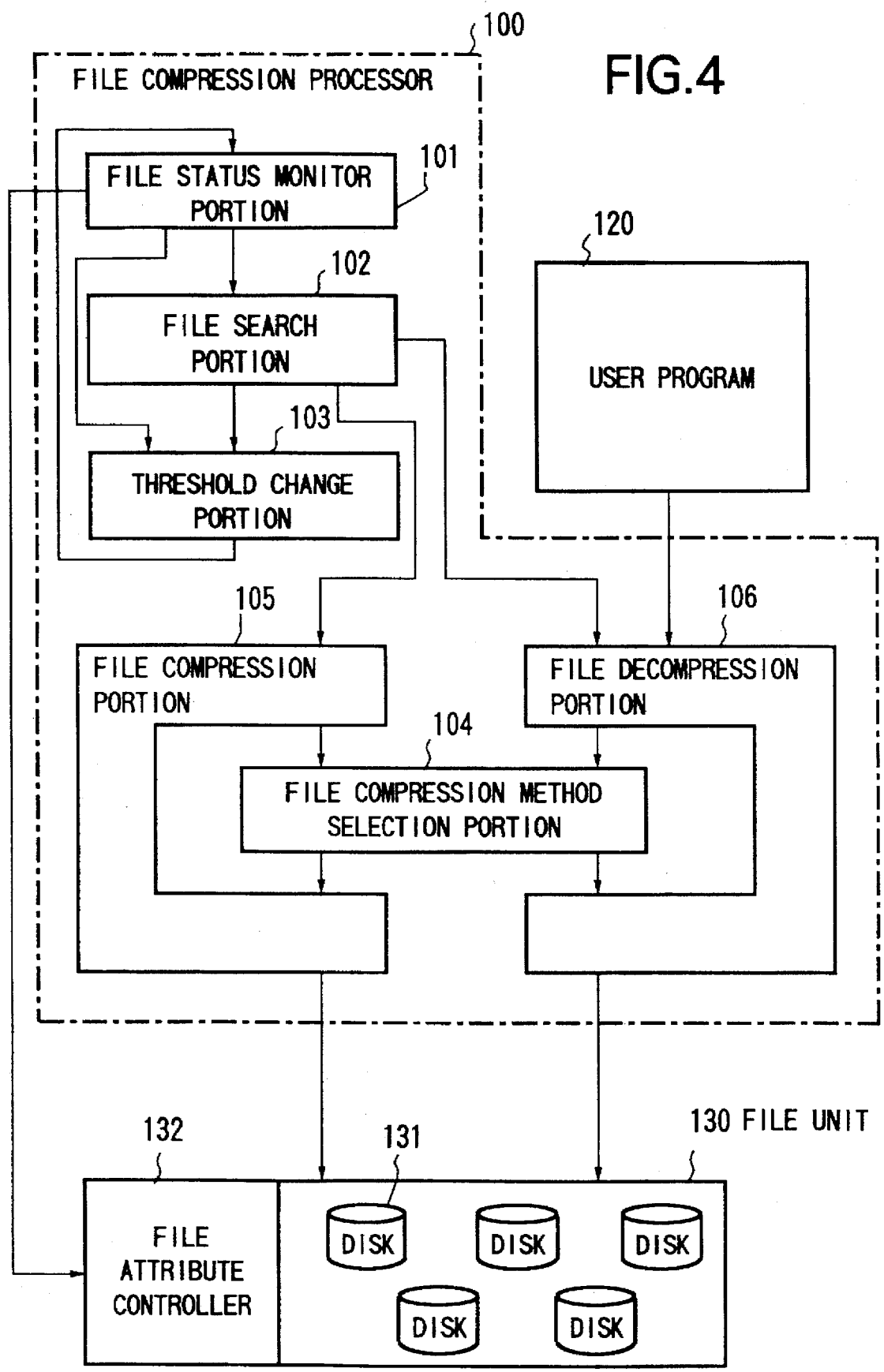
FIG. 4 is a block diagram of a file compression processor according to a second embodiment of the present invention.

FIG. 4 is a block diagram to show a file compression processor according to a second embodiment of the present invention, with the same reference numerals as the first embodiment of FIG. 1 for common components.

A file compression processor of the second embodiment has, in addition to the components existing in the first embodiment, a threshold change portion 103. The threshold change portion 103 controls (increases/decreases) the threshold value, which is compared with the available file capacity by the file status monitor portion 101. The file search portion 102 is provided with an additional function to search for files with high access frequency from the files compressed already. According to this embodiment, when the file status monitor portion 101 judges that the threshold value is the initial value and that the available file capacity is over the threshold, the file search portion 102 searches the already compressed files for files with high access frequency so that the file decompression portion 106 decompresses such files. Other components are the same as the first embodiment and description for them is omitted.

Figure 5:
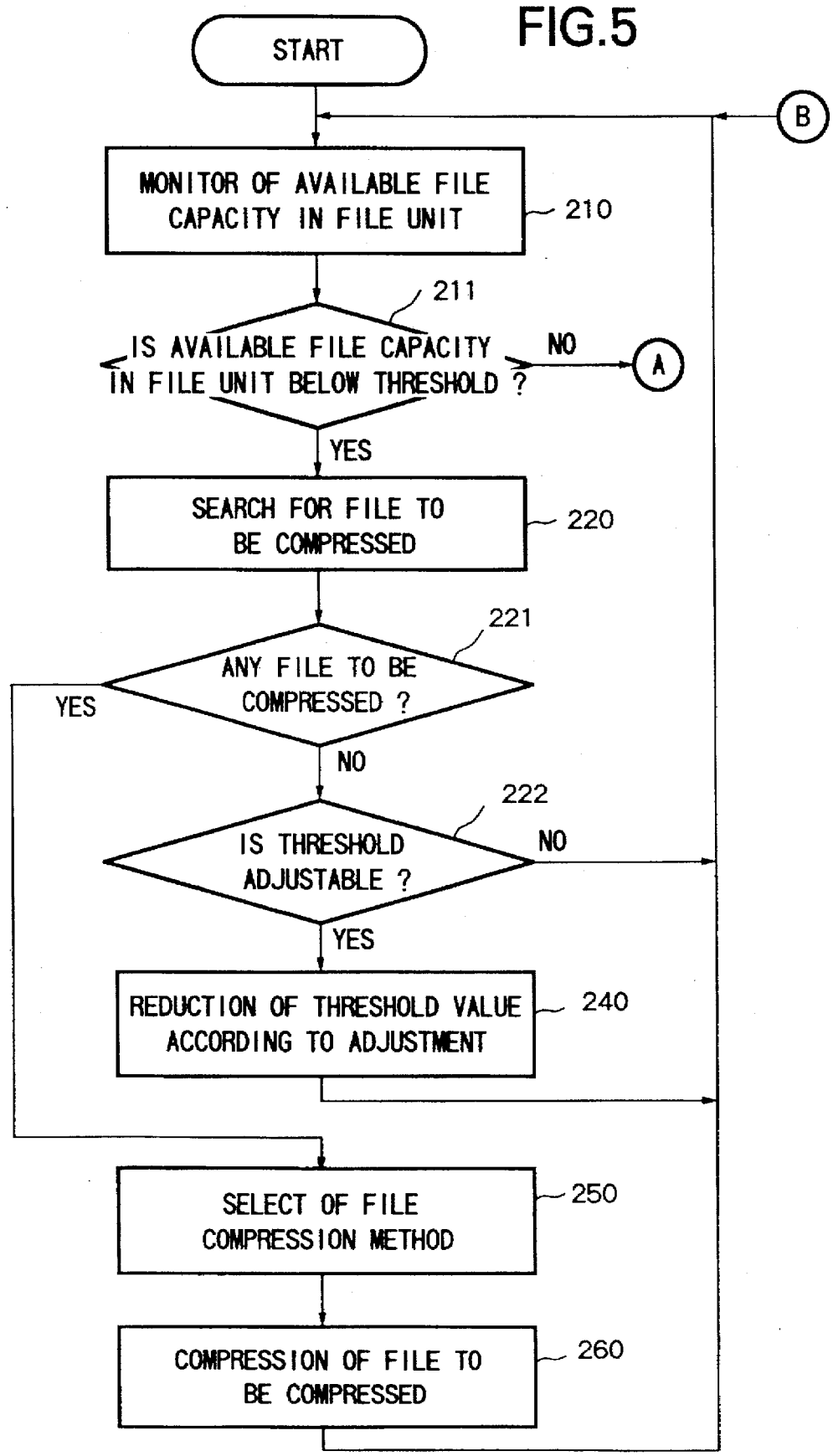
FIG. 5 is a flowchart to show the operation of the file compression processor according to the second embodiment.
Figure 6:
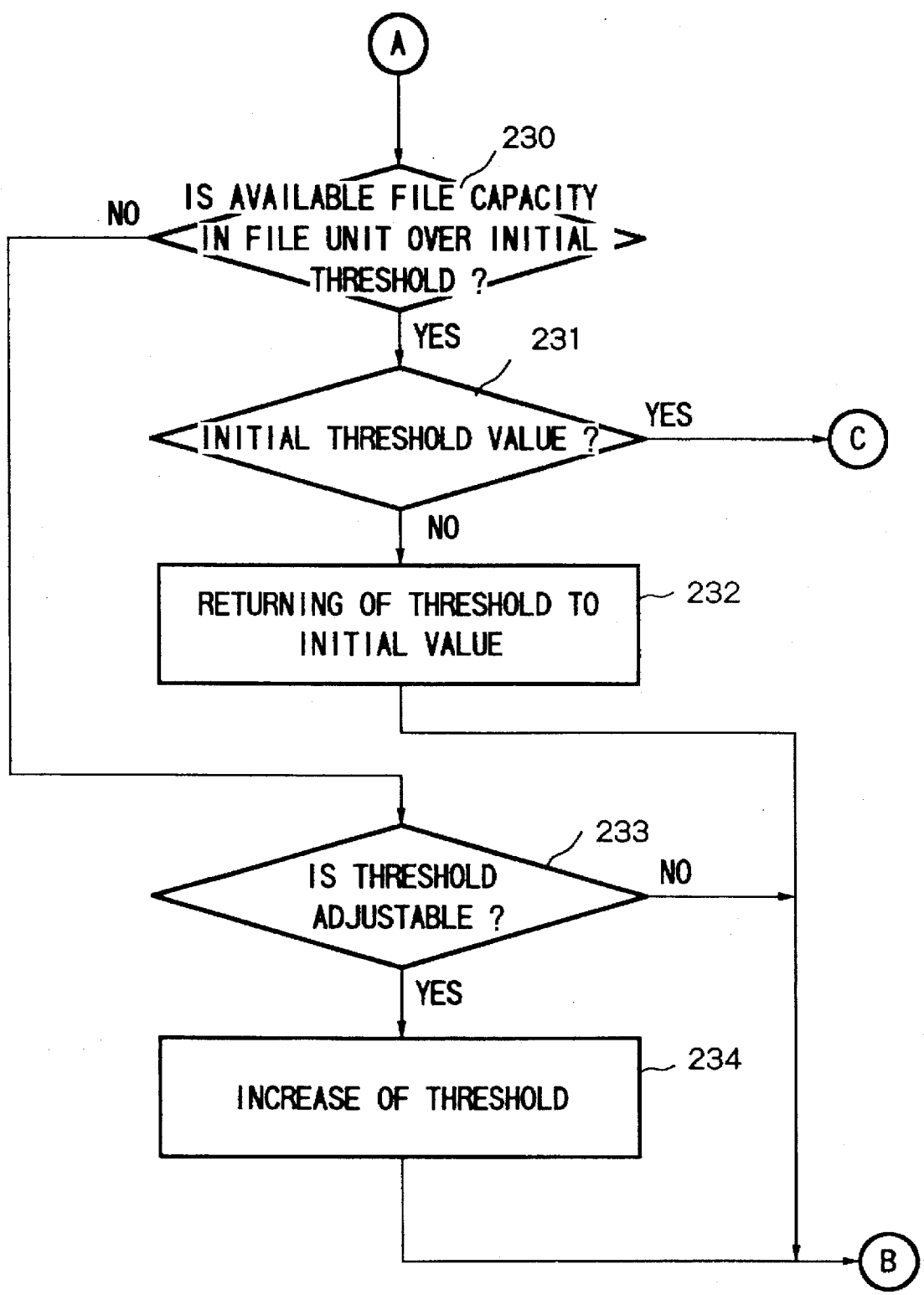
FIG. 6 is a flowchart to show the operation of the file compression processor according to the second embodiment.
Figure 7:
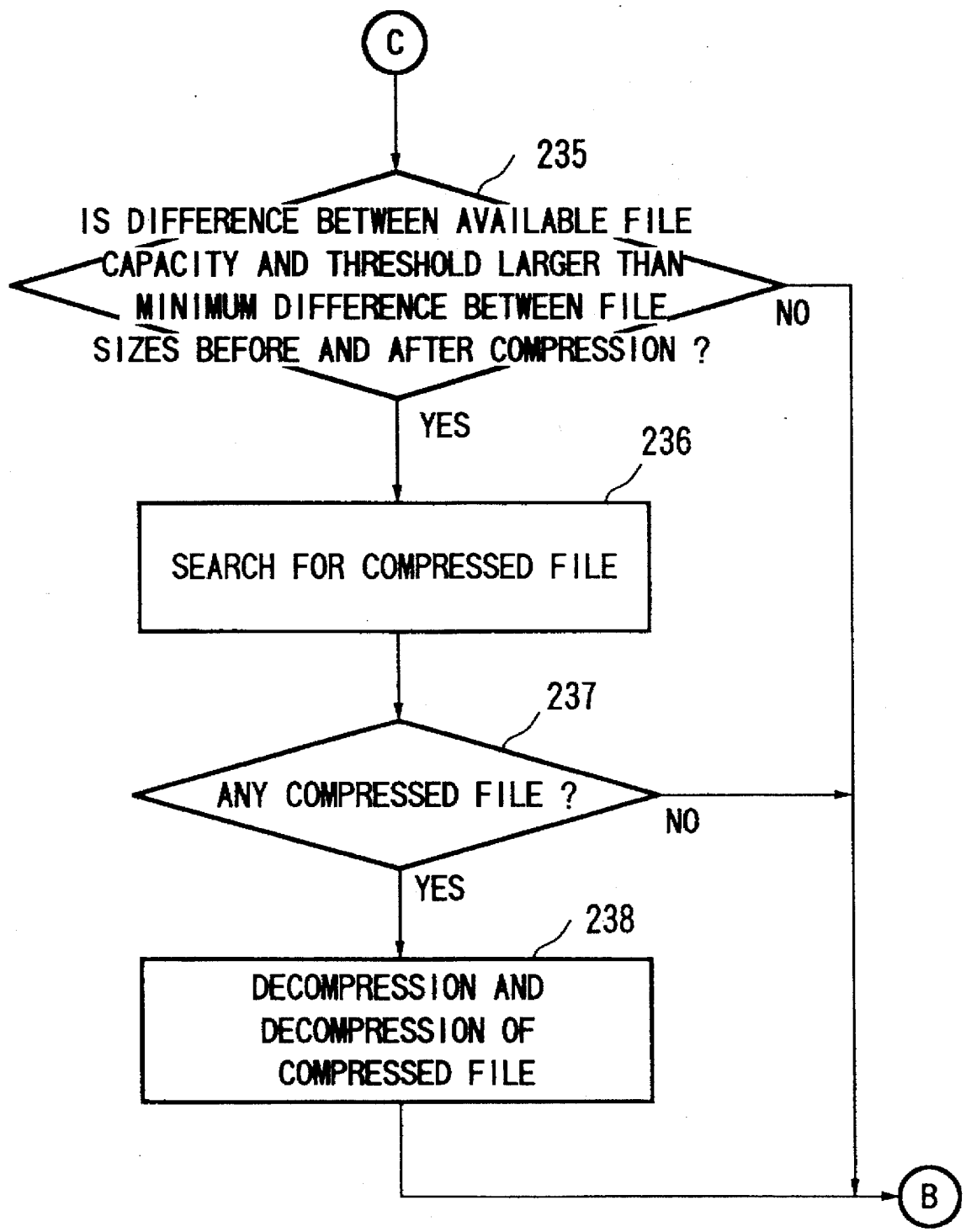
FIG. 7 is a flowchart to show the operation of the file compression processor according to the second embodiment.

FIGS. 5, 6 and 7 are flowcharts to illustrate the operation according to the second embodiment. The same numbers are given to the steps existing in the flowchart of FIG. 2.

If there is no file to be compressed in Step 221, then it is judged whether the threshold value can be decreased by the predetermined adjustment value by the threshold change portion 103. The threshold change portion 103 judges, when the threshold decreased by the predetermined adjustment value is larger than the maximum difference between the file sizes before and after compression among the files controlled by the file attribute controller 132, that the threshold is adjustable and decreases the currently set threshold by the predetermined adjustment value (Step 240).

Figure 8:
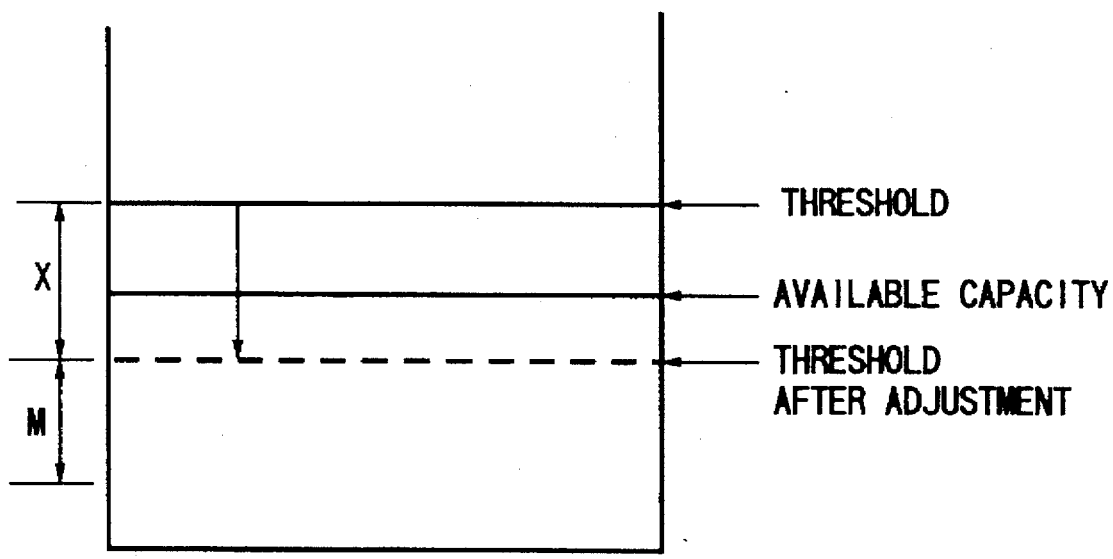
FIG. 8 is an explanatory view to illustrate the reduction of the threshold in Steps 222 and 240 of FIG. 5.

FIG. 8 shows how the threshold is decreased in Steps 222 and 240. Here, the predetermined adjustment value is "X", and the maximum difference between the file size before and after compression is "M".

When the threshold after adjustment is larger than the maximum difference between the sizes of files before and after compression, the threshold value is decreased so as to maintain the available file capacity larger than the maximum difference between the file sizes before and after compression. Thus, even if the file with the maximum difference between sizes before and after compression is to be decompressed, such decompressed file can be made on the file unit 130. Further, with decrease of the threshold value by the predetermined adjustment value, it is judged "No" in Step 211 and the system proceeds to Step 230 (FIG. 6). The predetermined adjustment value for the threshold is set at the threshold change portion 103 in advance.

The procedure shown in FIG. 6 (Steps 230 to 234) is the processing to reset the threshold to the initial value (the original available file capacity to be maintained). This processing is required when the available file capacity increases because the operating system deletes or reduces files on the file unit 130 through file control.

Figure 9:
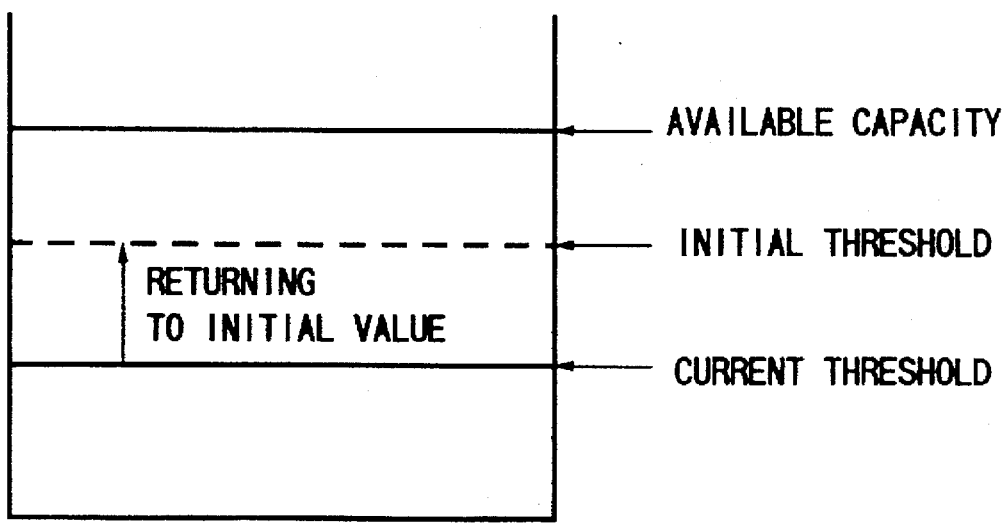
FIG. 9 is an explanatory view to illustrate resetting to the initial threshold value in FIG. 6.

The threshold change portion 103 judges whether the available file capacity exceeds the initial threshold (Step 230) and whether or not the current threshold is the initial value (Step 231) and returns the current threshold to the initial value when necessary conditions are satisfied (Step 232). Then, the system returns to Step 210 for status monitoring of the available capacity. FIG. 9 shows this resetting to the initial threshold value.

Figure 10:
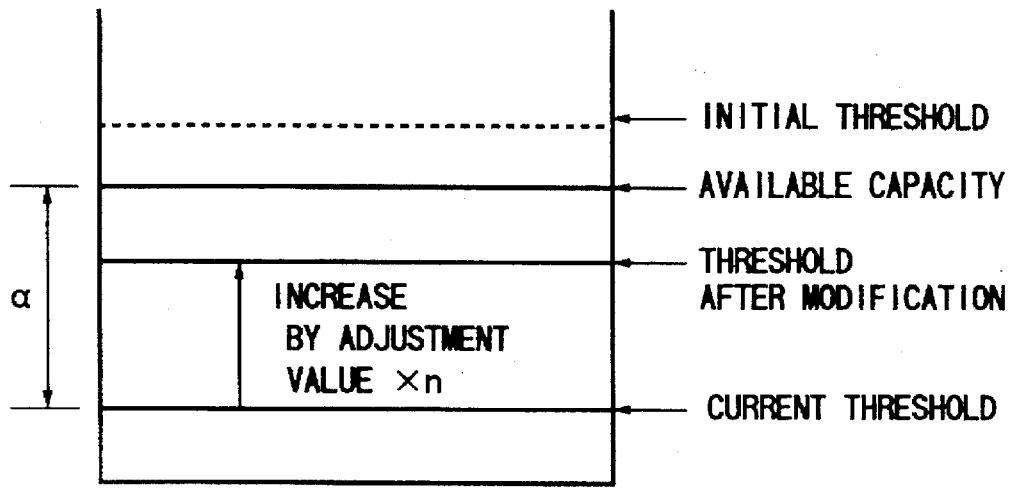
FIG. 10 is an explanatory view to illustrate increasing of the threshold value in FIG. 6.

When the available file capacity is judged to be smaller than the initial threshold in Step 230, it is then judged whether the difference "α" between the available capacity value and the current threshold is larger than the predetermined adjustment value "X" (Step 233). When it is judged larger, then the difference "α" between the available capacity and the current threshold is divided by the predetermined adjustment value "X" and the current threshold is increased by the product of the integer obtained in the above division and the predetermined adjustment value "X" (Step 234). Then the system returns again to Step 210 and monitors the available file capacity. FIG. 10 shows the increase processing for the threshold value.

As described above, when the available file capacity is increased by deletion or reduction of files, the threshold value is returned to the initial value in Step 240 or increased to a value closer to the initial value in Step 234 so that the available file capacity to be secured is maintained at a certain level. The threshold value does not become larger than the initial value.

FIG. 7 shows the decompression processing for compressed files with high access frequency when the available capacity increases because of deletion and reduction of files in file control by the operating system and exceeds the initial value of the threshold (Step 230) and the threshold value is judged to be the initial value in Step 231 in FIG. 6.

The file search portion 102 judges whether the difference between the available file capacity and the initial threshold value is larger than the minimum difference between the file sizes before and after the compression (Step 235). If it is larger, then a search is conducted for the compressed files (Step 236). "Compressed files" searched here are the files already compressed and with high access frequency. The access frequency is, as described above, judged based on the file control information at the file attribute controller 132. When the difference between the available file capacity and the initial threshold is not larger than the minimum difference between the file sizes before and after the compression in Step 235, then the system returns to Step 210 and monitors the status of the available capacity.

Figure 11:
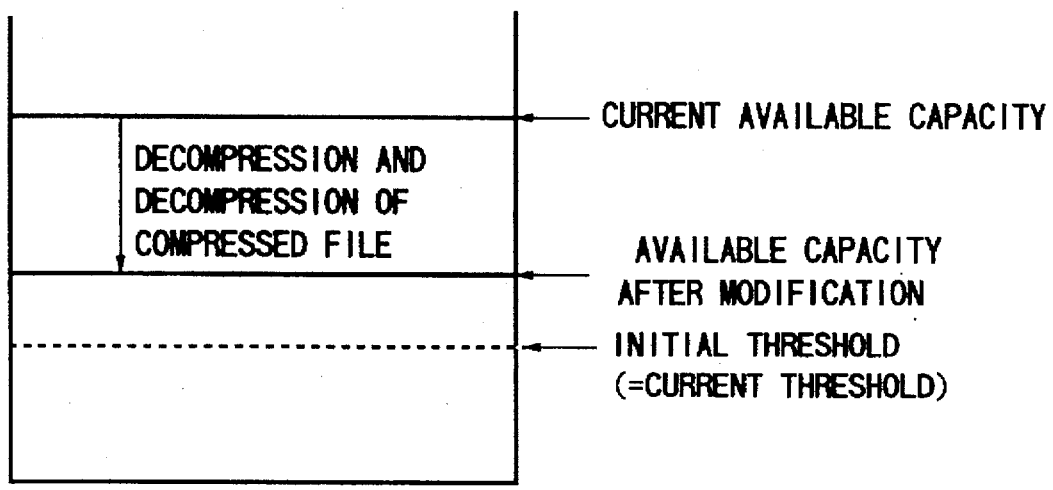
FIG. 11 is an explanatory view to illustrate the decompression processing for "compressed files" in Steps 235 to 238 in FIG. 7.

If any compressed file is found by searching (Step 237), then the file decompression portion 106 decompresses the file (Step 238). If there is no compressed file, then the system returns to Step 210 and monitors the available capacity status. FIG. 11 shows the decompression processing for a compressed file in Steps 235 to 238.

Referring to FIG. 7, when there is no compressed file in Step 236, all files are deemed to have been decompressed and the file decompression portion 106 does not decompress any file. The files other than compressed files with high access frequency are not treated as "compressed files". Thus, decompressed files are with high access frequency, and rarely compressed as "files to be compressed" in Steps 220 to 260 immediately after such decompression even if the available capacity decreases due to file addition.

By decompressing "compressed files" above until the available capacity becomes close to the initial threshold value when the available file capacity is increased due to deletion or reduction of files, the user program 120 can access a file on the file unit 130 preventing as far as possible the decompression processing by the file decompression portion 106.

When the difference between the current available file capacity and the threshold is smaller than the minimum difference of file sizes before and after the compression among all files controlled by the file attribute controller 132, the file search portion 102 does not decompress any file with the file decompression portion 106 even if there is any "compressed file". This is because file decompression makes the available file capacity smaller than the threshold if the difference between the current file capacity and the threshold is smaller than the minimum difference between the file sizes before and after compression among the files controlled by the file attribute controller 132.

As described above, the system of the invention monitors the available file capacity, determines whether or not the file decompression is required depending on the difference between the available capacity and the threshold and selects the suitable compression method for a file corresponding to the access frequency and data attribute of the file. This realizes decompression of files at a higher speed for more effective file utilization than conventional systems where all files are compressed by the same compression method.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A file compression processor comprising:

file status monitor means for comparing a current available capacity of a file unit with a threshold value predetermined as an upper limit of an available capacity value to be ensured in said file unit;

file compression means for compressing files recorded in said file unit;

file attribute control means for storing control information for the files recorded in the file unit, the control information including a last access date, a number of accesses and whether the file is already compressed or not; and file search means for searching for files which have not yet been compressed based on the control information of said file attribute control means so as to select files to be compressed in an order of access frequency by said file compression means;

wherein said file compression means compresses files in said file unit selected by said file search means when said file status monitor means judges that said current available capacity is smaller than the threshold value, and does not compress files in said file unit when said file status monitor means judges that said current available capacity is larger than the threshold value.

2. A file compression processor as set forth in claim 1, further comprising:

file attribute control means for storing control information for files on the file unit, the control information including a last access date, a number of accesses, whether the file is already compressed or not and a data type;

compression method selection means for determining the data type and an access frequency of the file to be compressed by said file compression means based on the control information of said file attribute control means, and selecting a file compression method suitable for said data type and the access frequency of the file to be compressed and instructing said compression means to compress the file to be compressed by the selected compression method.

3. A file compression processor as set forth in claim 1, further comprising:

file attribute control means for storing control information for the files recorded in the file unit, the control information including a last access date, a number of accesses, whether the file is already compressed or not and a data type;

file search means for searching for files not yet compressed with low access frequency based on the control information of said file attribute control means so as to select files to be compressed for compression by said compression means; and compression method selection means for determining the data type and an access frequency of the file to be compressed selected by said file search means based on the control information of said file attribute control means, and selecting the file compression method suitable for said data type and the access frequency of the file to be compressed and instructing said compression means to compress the file to be compressed by the selected compression method.

4. A file compression controller as set forth in claim 1, further comprising:

file decompression means for decompressing files already compressed corresponding to an access request from the compressed file recorded on said file unit.

5. A file compression controller as set forth in claim 2, further comprising:

file decompression means for decompressing files already compressed corresponding to an access request from the compressed file recorded on said file unit;

wherein said file decompression means decompresses the compressed files by a decompression method corresponding to said selected compression method.

6. A file compression processor comprising:

file status monitor means for comparing a current available capacity of a file unit with a threshold value predetermined as an upper limit of an available capacity value to be ensured in said file unit;

file compression means for compressing files recorded in said file unit;

threshold change means for reducing said threshold value by a predetermined adjustment value when said current available capacity is smaller than said threshold value and there is no file to be compressed, and increasing said threshold value when said current available capacity is larger than said threshold value;

file attribute control means for storing control information for the files recorded in the file unit, the control information including a last access date, a number of accesses and whether the file is already compressed or not; and file search means for searching for files which have not yet been compressed based on the control information of said file attribute control means so as to select files to be compressed in an order of access frequency by said file compression means;

wherein said file compression means compresses files in said file unit selected by said file search means when said file status monitor means judges that said current available capacity is smaller than the threshold value, and does not compress files in said file unit when said file status monitor means judges that said current available capacity is larger than the threshold value.

7. A file compression processor as set forth in claim 6, further comprising:

file attribute control means for storing control information for the files recorded in the file unit, the control information including a last access date, a number of accesses, whether the file is already compressed or not and a data type;

compression method selection means for determining the data type and an access frequency of the file to be compressed by said compression means based on the control information of said file attribute control means, and selecting the file compression method suitable for said data type and the access frequency of the file to be compressed and instructing said compression means to compress the file to be compressed by the selected compression method.

8. A file compression processor as set forth in claim 6, further comprising:

file attribute control means for storing control information for files recorded on the file unit, the control information including a last access date, a number of accesses, whether the file is already compressed or not and a data type;

file search means for searching for files not yet compressed with low access frequency based on the control information of said file attribute control means so as to select files to be compressed for compression by said compression means; and compression method selection means for determining the data type and an access frequency of the file to be compressed selected by said file search means based on the control information of said file attribute control means, and selecting the file compression method suitable for said data type and the access frequency of the file to be compressed, and instructing said compression means to compress the file to be compressed by the selected compression method.

9. A file compression processor as set forth in claim 6, further comprising:

file attribute control means for storing control information for the files recorded in the file unit, the control information including a last access date, a number of accesses, whether the file is already compressed or not, maximum and minimum differences of the file sizes before and after compression; and file search means for searching for files not yet compressed with low access frequency based on the control information of said file attribute control means so as to select files to be compressed for compression by said compression means, wherein said threshold change means reduces said threshold value by the predetermined adjustment value if there is no file to be compressed and the threshold value becomes larger than the maximum difference between the file sizes before and after compression when said threshold value is reduced by the predetermined adjustment value.

10. A file compression processor as set forth in claim 6, further comprising:

file decompression means for decompressing files already compressed corresponding to the access request from an compressed file recorded on said file unit.

11. A file compression processor as set forth in claim 6, wherein said threshold change means returns the threshold value to an initial value when it judges that the threshold value is not the initial value and said available capacity is larger than said initial value of said threshold value.

12. A file compression processor as set forth in claim 6, further comprising:

file decompression means for decompressing compressed files until said available capacity approaches an initial value when the file status monitor means judges that said threshold value is the initial value and said available capacity is larger than said threshold value.

13. A file compression processor as set forth in claim 12, further comprising:

file attribute control means for storing control information for the files recorded in the file unit, the control information including a last access date, a number of accesses, whether the file is already compressed or not, maximum and minimum differences between the file sizes before and after compression; and file search means for searching for already compressed files with high access frequency based on the control information of said file attribute control means so as to select compressed files for decompression by said decompression means.

14. A file compression processor as set forth in claim 13, wherein the compressed files are selected for decompression by said decompression means when it is judged that the threshold is the initial value and the difference between the available capacity and the threshold is larger than the minimum difference between the file sizes before and after compression.

15. A file compression processor comprising:

file status monitor means for comparing a current available capacity of a file unit with a threshold value predetermined as an upper limit of an available capacity value to be ensured in said file unit;

file compression means for comprising files recorded in said file unit;

threshold change means for reducing said threshold value by a predetermined adjustment value when said current available capacity is smaller than said threshold value and there is no file to be compressed, and increasing said threshold value when said current available capacity is larger than said threshold value;

wherein said file compression means compresses files in said file unit selected by said file search means when said file status monitor means judges that said current available capacity is smaller than the threshold value, and does not compress files in said file unit when said file status monitor means judges that said current available capacity is larger than the threshold value;

wherein said threshold change means increases said threshold value by a product of (1) said predetermined adjustment value and (2) an integer obtained by dividing (a) the difference between said current available capacity and the threshold value with (b) said predetermined adjustment value, when it is judged that said threshold value is not the initial value and said current available capacity is smaller than said initial threshold value and the difference between said current available capacity and the threshold value is larger than said predetermined adjustment value.

\* \* \* \* \*